Fig. 1.

May 13, 1941.  G. E. BARSTOW  2,242,164
CHAIN MAKING MACHINE
Filed July 3, 1940   13 Sheets-Sheet 6

May 13, 1941.    G. E. BARSTOW    2,242,164
CHAIN MAKING MACHINE
Filed July 3, 1940    13 Sheets-Sheet 9

Inventor:
George E. Barstow,
by Emery, Booth, Townsend, Miller & Neidner
Attys.

Patented May 13, 1941

2,242,164

UNITED STATES PATENT OFFICE 2,242,164

CHAIN MAKING MACHINE

George E. Barstow, Lakeville, Mass.

Application July 3, 1940, Serial No. 343,784

20 Claims. (Cl. 59—31)

This invention relates to chain making machines of the class employed in the manufacture of chains formed of oval or elongated links with their loops interlocked, and is more especially concerned with a machine for feeding and manipulating a previously assembled chain in connection with the welding of the joints, though the welding itself is not a part of the present invention.

In accordance with the invention, a step-by-step, lengthwise movement is imparted to the chain by an amount substantially equal to the distance between the centers of alternate links, and the links are brought, one by one, to a work station or welding point where the link is squeezed lengthwise thus closing the joint firmly during the welding. Also, in accordance with the invention, the chain feeding means includes dies which engage opposite ends of the link being operated upon at the welding point. These particular dies may be carried, for example, by a die carrier, herein a rotatable turret, associated with means to utilize the carrier to cause the dies to advance the chain intermittently, and when a given link reaches the work station one of these dies is urged toward another to subject such link to endwise pressure. Other dies, which it will be convenient to call push-up dies cooperate with the chain-feeding dies to compress the link lengthwise, and one of these push-up dies also cooperates with the chain-feeding dies, one by one, to rotate the turret step-by-step.

Having thus forecast in a general way the nature of the invention, it may be added that the invention will best be understood by reference to the following description when taken in connection with the accompanying drawings of one specific embodiment thereof, while its scope will be pointed out more particularly in the appended claims.

Referring to the drawings and to the embodiment of the invention illustrated therein by way of example, there is shown that portion of a chain-making machine which is concerned with the handling of a pre-formed and assembled chain, exclusive of the actual welding, i. e. the guiding and feeding of the chain step-by-step to bring successive, alternate links to a work-station or welding point where each is subjected to endwise pressure to close the joint firmly for the welding operation not dealt with in this application. The several mechanisms will be described one at a time in their logical order, and finally their cooperative action will be outlined.

Chain guiding and feeding mechanism

Figure 8:
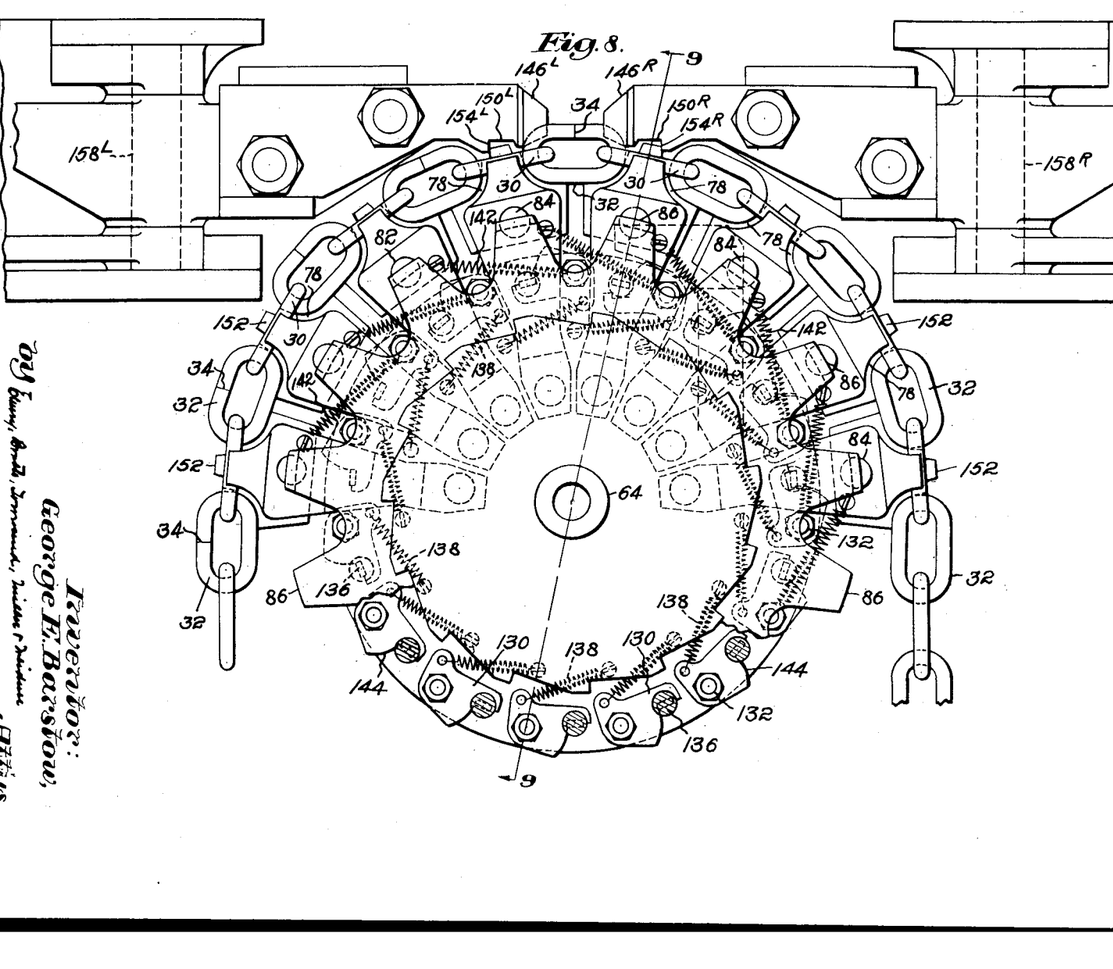
Fig. 8 is a plan showing some of the parts in Fig. 2 but on a larger scale.

The chain guiding and feeding mechanism will now be described, reference being had at first to Fig. 2. The chain is composed of oval links 30 alternating with like oval links 32, one set in a plane perpendicular to the other, each of the links 32 having a joint 34 (see Fig. 8 or 14) which is to be welded. It will require a second passage of the chain through the machine to weld the joints of the other set of links, or alternatively, the chain may have one set of links welded in one machine, and the chain may be passed to a second machine for the welding of the other set of links. In the present example, the links 32 are disposed in a horizontal plane.

When, as in the present example, the chain carrier is in the nature of a rotatable turret, turning about a vertical axis, the chain is carried in a U-shaped path in a horizontal plane (see Fig. 2) past a point which it will be convenient to call a work-station or welding point, designated 36. Before starting in this path, the chain is passed vertically and upwardly and part way about an idler wheel 38 mounted to turn about a horizontal axis. After the chain has passed along the U-shaped path, the chain is passed over a wheel 40. These two wheels and their mountings will now be described, reference being had at first to Fig. 12.

Figures 12, 13:
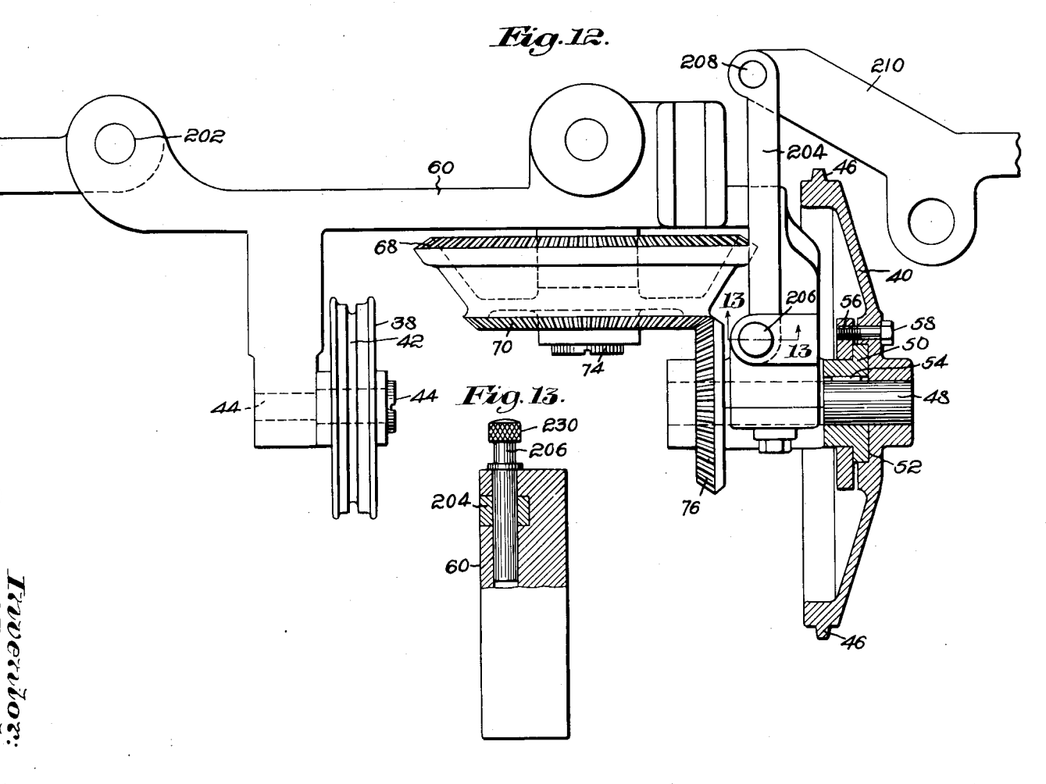
Fig. 12 is a horizontal section, on an enlarged scale, on line 12—12 of Fig. 1.
Fig. 13 is a vertical section, on line 13—13 of Fig. 12.

In the present example, the wheel 38 is provided with a groove 42 which receives the chain, and the wheel turns freely on a stud 44, while the wheel 40 is provided with teeth 46 and is mounted to turn freely on a shaft 48 to which, however, it may be fixedly secured, though capable of adjustment about its axis of rotation. One convenient means for this purpose is a disk 50 seated in a recess 52 in the wheel 40 and secured as by a key 54 to the shaft 48 and capable of being clamped firmly to the wheel 40 by a clamping ring 56 and a set of clamping screws 58. This adjustment is provided because, as will presently appear, the wheel 40 is driven in synchronism with the turret presently to be described.

The stud for the wheel 38 and the shaft 48 for the wheel 40 are supported by an appropriate mounting 60 on which (see Fig. 9) a turret 62 is also supported about an upright stud 64 fixedly mounted in the mounting 60. When the turret 62 is rotated step-by-step by mechanism presently to be described, the toothed wheel 40, hereinbefore described, is also rotated step-by-step through an appropriate mechanism such as the gear train now to be described.

The turret 62 is suitably secured as by a pin 65 to a bevel gear 66 which meshes with and drives a bevel gear 68 compounded with a bevel gear 70, both on a common hub 72 which turns freely on a stud 74 fixedly secured to the mounting 60. The bevel gear 70 (see Fig. 12) meshes with and drives a bevel gear 76 fixedly secured to the shaft 48, which, it will be remembered, drives the gear 40.

Figures 9, 10:
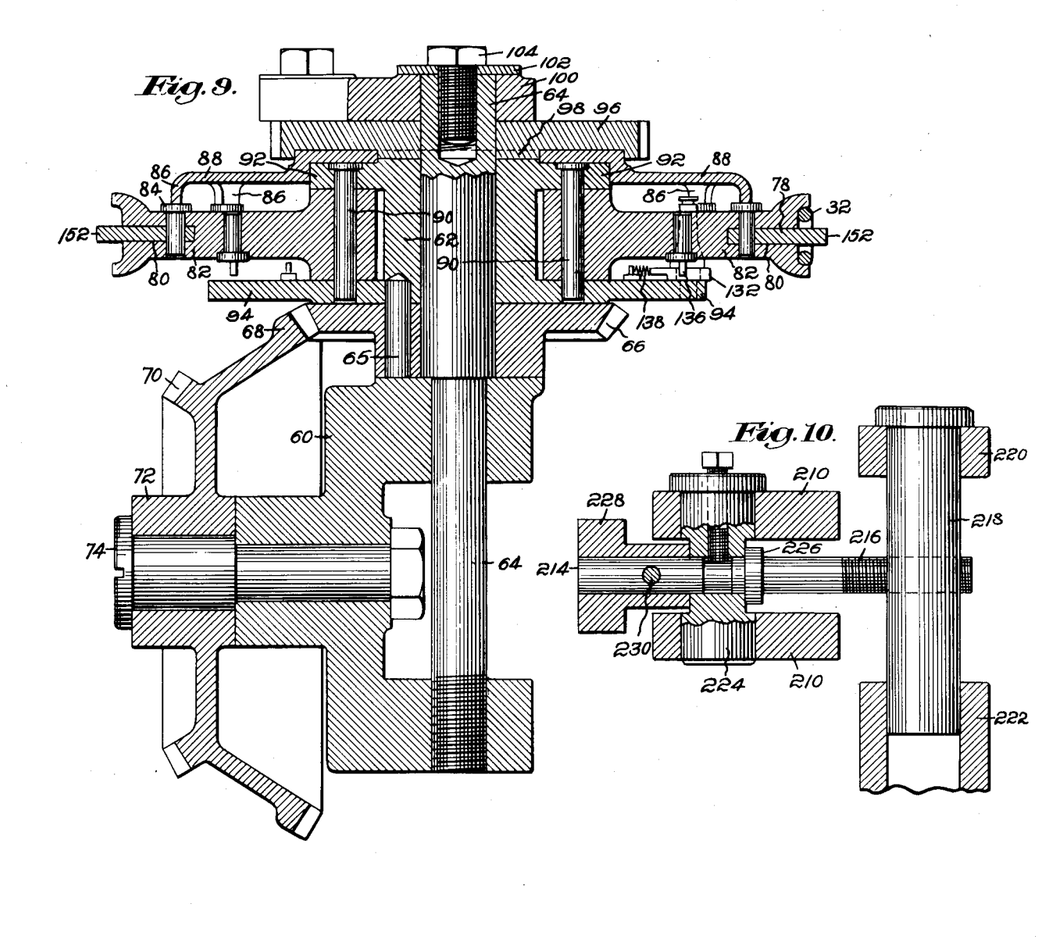
Fig. 9 is a vertical section on line 9—9 of Fig. 8.
Fig. 10 is a vertical section, on an enlarged scale on line 10—10 of Fig. 2.
Figure 11:
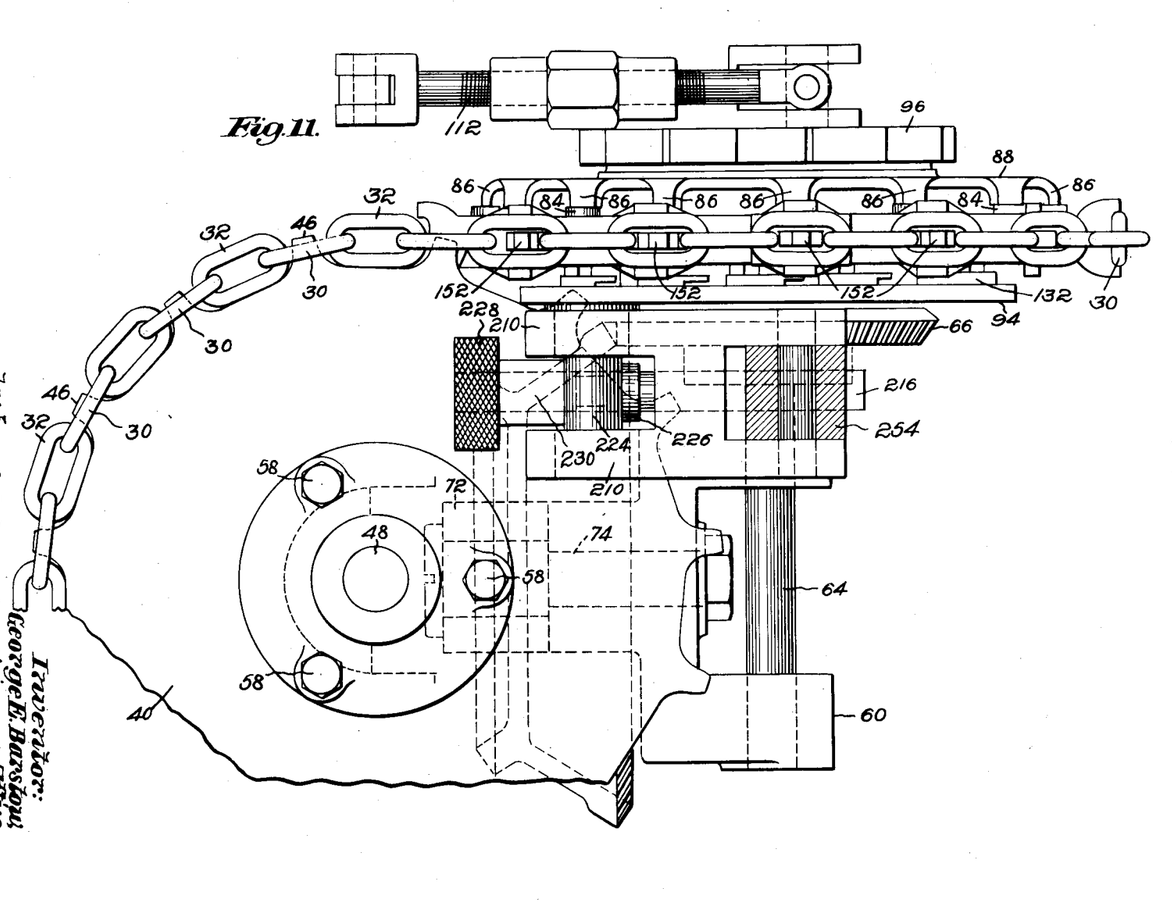
Fig. 11 is a vertical section, on an enlarged scale, on line 11—11 of Fig. 1.

The turret 62 drives the chain by appropriate means, now to be described, reference being had once more to Fig. 9. The turret carries a set of dies 78 which, in one sense, are like the teeth of a sprocket wheel because they enter the openings in the links 30 which are disposed in vertical planes, and in that sense they drive the chain. However, these dies have another important function, presently to be described, and to that end, instead of being rigidly supported by the turret, they are movably mounted on it in a manner now to be described, reference still being had to Fig. 9.

Each die 78 is received in a slot 80 in an arm 82 and is suitably secured therein as by a loose, headed pin 84 appropriately held in place as by a downwardly directed flange 86 on a cover-plate 88, removal of which enables the pins to be withdrawn upwardly thereby to permit removal and replacement of the dies. Each die-carrying arm 82, for a purpose which will presently appear, is pivotally mounted to swing horizontally with relation to the turret at a certain period in its rotation, and to this end each arm is mounted on a loose, headed pin 90 passed through upper and lower flanges 92 and 94 on the turret 62. The cover-plate 88 overlies the pins 90, also, and removal of the cover-plate permits removal of the arms 82.

Step-by-step rotation of the turret clockwise is conveniently accomplished as by a pawl and ratchet mechanism now to be described, reference still being had to Fig. 9. Above the turret 62 and above the cover-plate a ratchet wheel 96 is loosely mounted on the stud 64 and is coupled to the turret as by a key 98. Above the ratchet a pawl carrier 100 is loosely mounted on the stud 64 and is held in place thereon as by a washer 102 and a screw 104 threaded into the stud. The pawl carrier is thus mounted to rock about a vertical axis, and (see Fig. 2) carries a pawl 106 pivoted on a stud 108 and urged against the ratchet by an appropriate spring 110.

Figure 2:
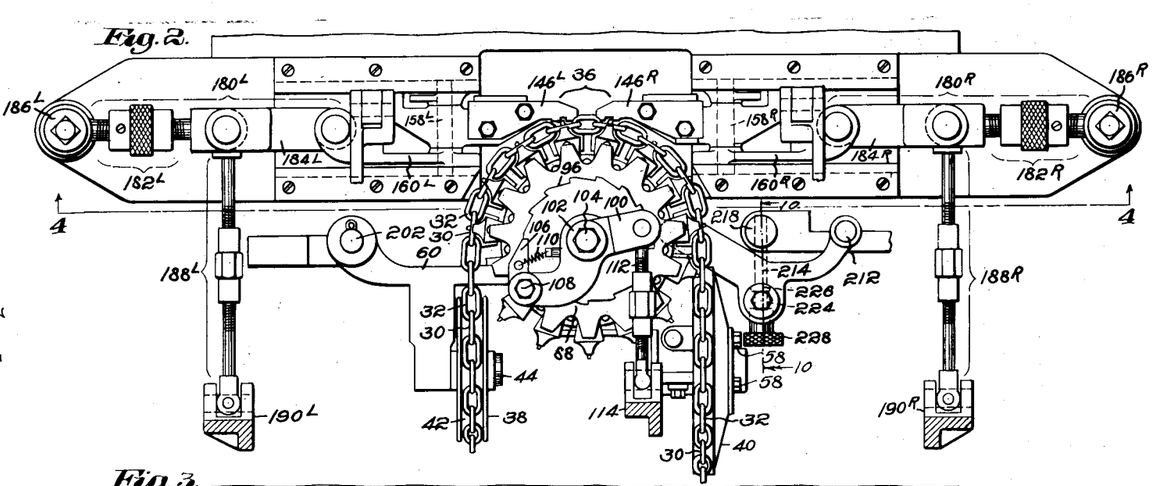
Fig. 2 is a horizontal sectional view on the line 2—2 in Fig. 1.
Figure 15:
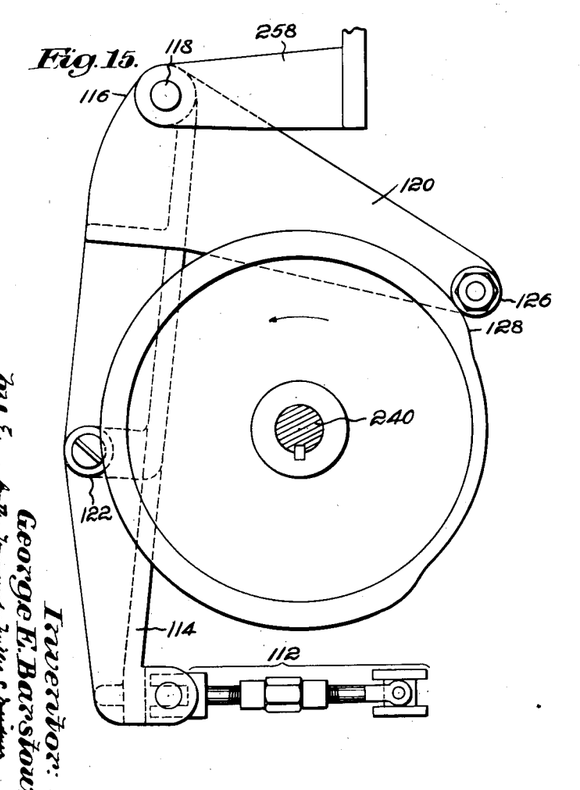
Fig. 15 is a vertical section on an enlarged scale on line 15—15 of Fig. 1.

A rocking motion is imparted to the pawl carrier 100 by appropriate mechanism such as that now to be described, reference being had at first to Fig. 2. The pawl carrier is connected by a link 112, preferably adjustable in length, to an arm 114 (see Fig. 15) of a bell-crank lever 116 mounted on a fulcrum 118 and having a second arm 120. The arm 114 carries a follower such as a roller 122 riding on a cam 124 and the arm 120 carries a follower such as a roller 126 riding on a cam 128. The cam 124 rocks the lever 116 in the proper direction to cause the pawl 106 to turn the ratchet 96 the proper distance and the cam 128 causes retraction of the pawl. A single cam with a closed path and a single roller might be substituted if desired, but I prefer the use of two edge cams.

Thus, the chain is advanced step-by-step by an amount substantially equal to the distance between two adjacent alternate links, and the links 32 lying in a horizontal plane are brought successively to the welding point 36. It will be remembered that the take-up sprocket wheel 40 is adjustably secured to its shaft 48 and it will also be recalled that this shaft is driven in synchronism with the turret 62. This adjustment is provided because of the fact that the chain is shortened somewhat by the endwise compression of the links during the welding. Thus the take-up, though positive in its action, and maintaining the chain taut on the dies 78 of the turret arms 82, nevertheless is adjustable exactly to meet the need due to the shortening of the chain.

Locking and unlocking of turret arms

It will be remembered that the turret arms 82 are pivoted on the turret 62, and it will also be recalled that the dies 78 are to serve, not only as sprocket teeth to feed the chain, but also to cooperate with other dies to compress each link 32 endwise at the welding point. These requirements call for locking each turret arm to the turret except at the point where the arm should be capable of swinging on its pivot to enable its die to exert an endwise pressure on the link.

Figures 14, 14A:
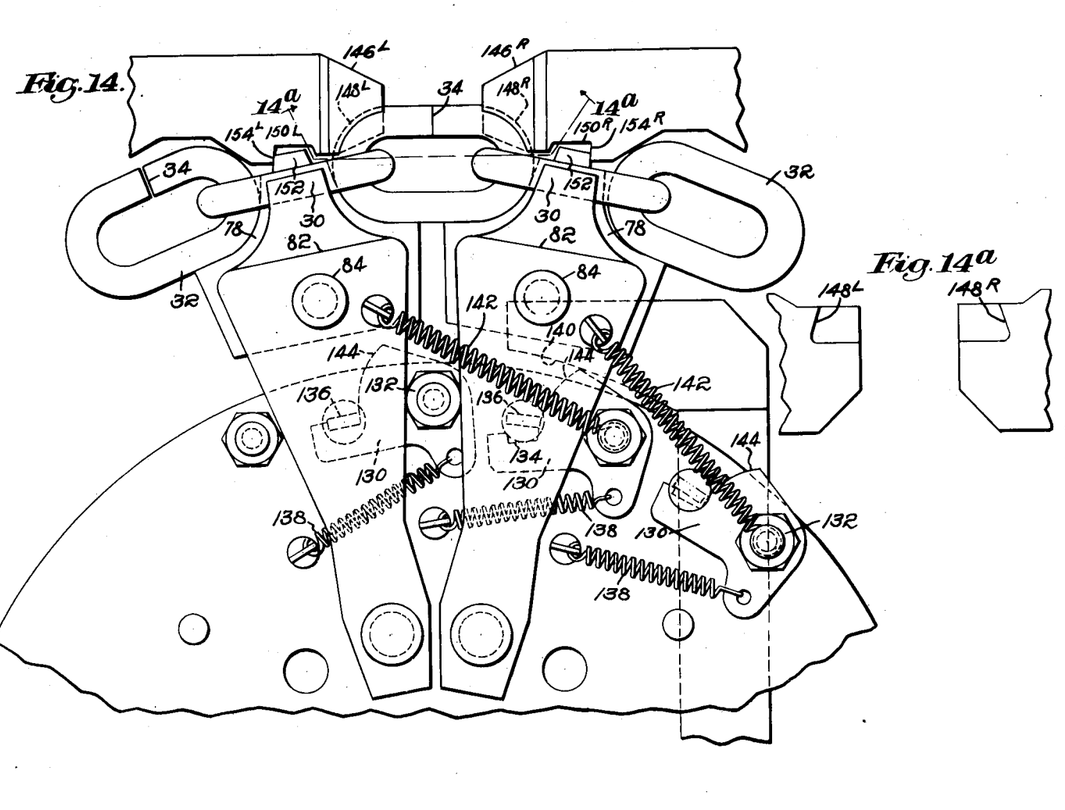
Fig. 14 is a plan of some of the parts shown in Fig. 8 but on an enlarged scale.
Fig. 14A is a section on line 14A—14A of Fig. 14.

To these ends, the arms 82 normally are locked to the turret 62, are unlocked therefrom, one at a time, and are again locked to the turret by appropriate mechanism such as that now to be described, reference being had at first to Fig. 14.

The turret carries a series of latches 130 mounted on pivots 132 and provided with recesses 134 which normally receive pins 136 carried by the respective arms 82 thereby locking said arms to the turret. This normal interlocking engagement is maintained by appropriately arranged springs 138. This interlocking engagement is temporarily interrupted as by successive engagement of the latches with a fixed cam 140 which utilizes rotation of the turret to swing each latch in opposition to its spring out of engagement with its locking pin.

The arm 82 is now unlocked and is restrained only by an appropriately arranged spring 142 which tends normally to maintain the locking pin 136 against an arcuate surface 144 on the latch and concentric with the pivotal axis of the latter. The arm being unlocked and the turret stopped, another agency such as that now to be described takes control of the arm temporarily and swings it contra-clockwise in Fig. 14 against the resistance of its spring to cause the die 78 carried by that arm to exert pressure against the adjacent end of the link 32 now at the welding point.

*Push-up die mechanism*

The push-up dies and their actuating mechanism will now be described, reference being had at first to Fig. 14. There are left and right push-up dies 146L and 146R which are identical except that one is formed left-handed and the other right-handed, and they are operated by mechanisms which are for the most part identical, and they might actually be identical in all respects, though in the present example, as will presently appear, the left-hand die makes its full travel at once while the right-hand die travels at first part way toward its final position and later travels the remainder of the distance while it is squeezing the link endwise.

The dies 146L and 146R are provided with recesses 148L and 148R properly shaped for the ends of the link 32 and slightly undercut (see Fig. 14A) to overhang the link. The dies (see Fig. 14) are provided, respectively, with recesses 150L and 150R formed to receive identical teeth 152 on the several dies 78 carried by the turret arms, and the recesses have shoulders 154L and 154R which, as shown in Fig. 14, engage these teeth. In fact, when one of the turret arms is unlocked, as hereinbefore described, it is this shoulder 154R on the right-hand push-up die which swings the arm 82 and the die 78 thereon to cause the latter to cooperate with the push-up die 146R to exert an endwise pressure on the link to close up the joint 34 during the welding. The push-up dies have a horizontal movement toward each other to compress the link endwise, then the dies recede from each other, and finally the dies descend to clear the chain and the turret arms and return to their initial positions.

Figure 4:
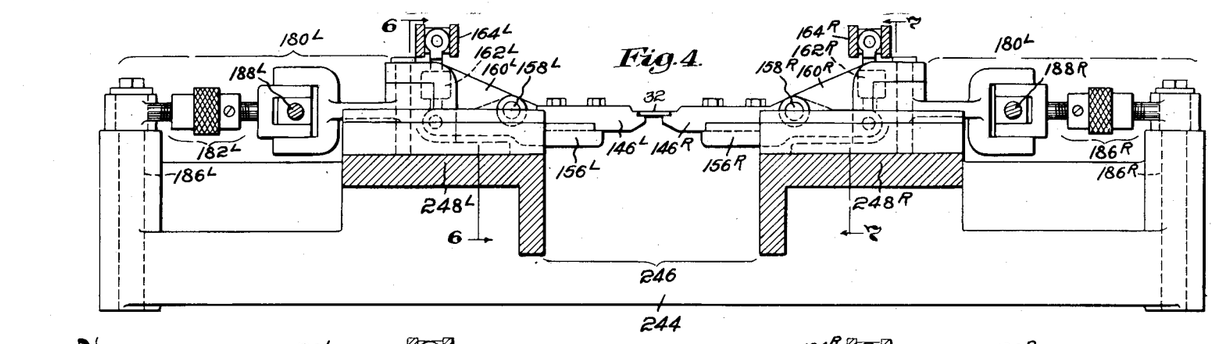
Fig. 4 is a vertical section on line 4—4 of Fig. 2, with certain parts shown in Fig. 2 omitted.
Figure 5:
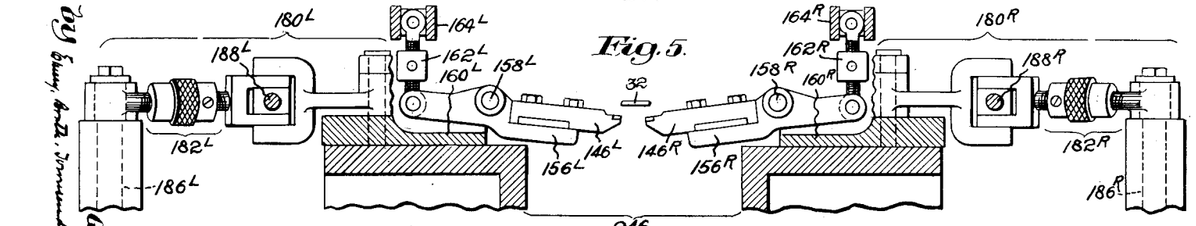
Fig. 5 is a vertical section on line 5—5 of Fig. 3, with certain parts shown in Fig. 3 omitted.

The mechanism for accomplishing these movements will now be described, reference being had at first to Fig. 4. The push-up dies 146L and 146R are suitably secured to levers 156L and 156R which are mounted on pivots 158L and 158R on carriers such as slides 160L and 160R (see Fig. 5) which, as will presently appear, are reciprocated horizontally toward and from each other. The rocking motion of the levers is produced by appropriate mechanism such as adjustable links 162L and 162R, connecting the levers 156L and 156R to arms 164L and 164R (see Figs. 6 and 7) which are secured as by keying to a rockshaft 166.

Figure 6:
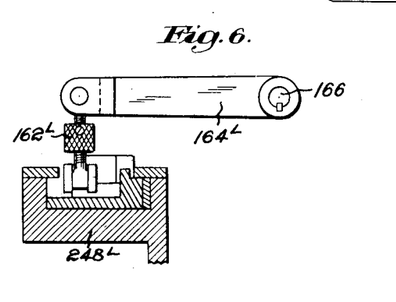
Fig. 6 is a vertical section on line 6—6 of Fig. 4.
Figure 16:
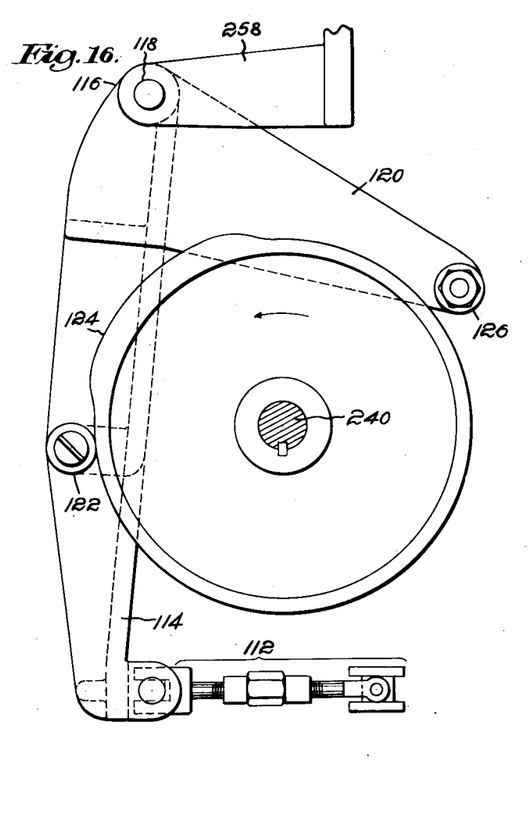
Fig. 16 is a vertical section on an enlarged scale on line 16—16 of Fig. 1.
Figures 17, 18:
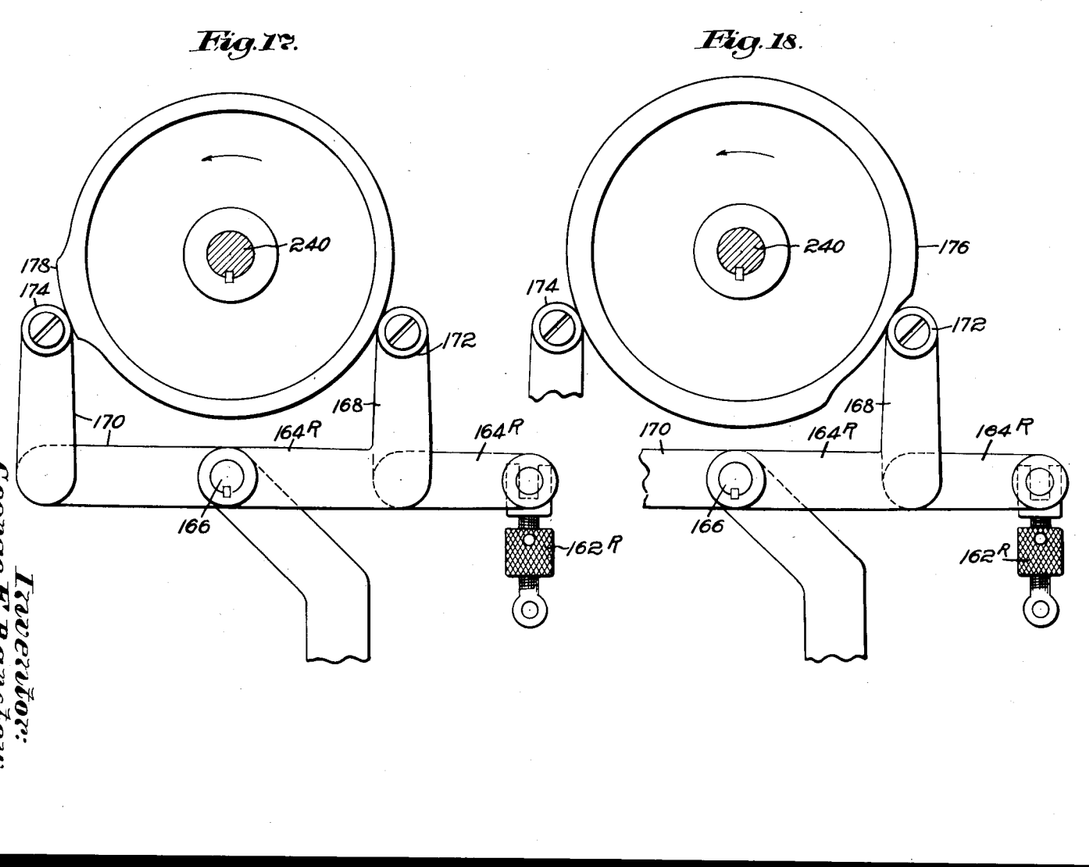
Fig. 17 is a vertical section on an enlarged scale on line 17—17 of Fig. 1.
Fig. 18 is a vertical section on an enlarged scale on line 18—18 of Fig. 1.

The arm 164L is of the simple form shown in Fig. 6 but the arm 164R differs therefrom by the addition of an arm 168 extending upwardly and by the addition of a second arm 170 which extends horizontally and then upwardly. Referring now to Figs. 16 and 17, the arms 168 and 170 carry cam followers such as rollers 172 and 174, one resting against the perimeter of a cam 176 and the other against the perimeter of a cam 178. While a single arm, a single roller and a single cam having a groove to receive the roller might be employed, I prefer the arrangement shown.

Figure 3:
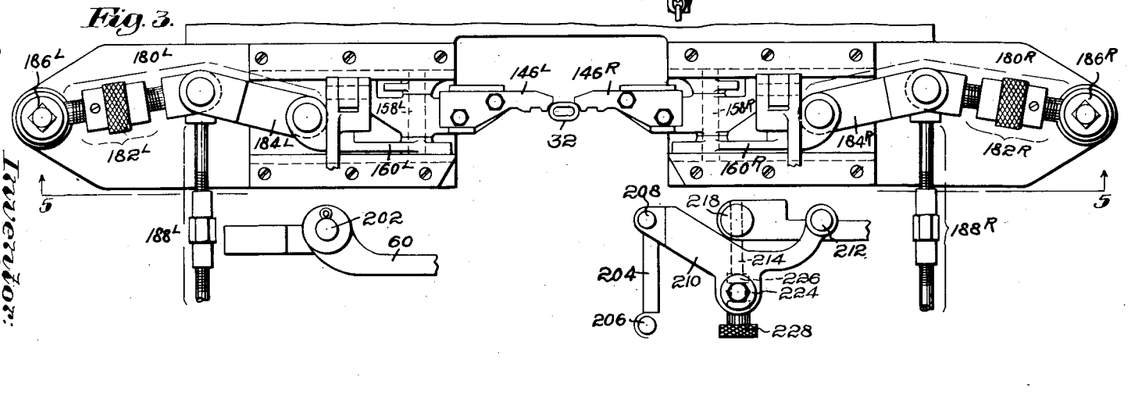
Fig. 3 is a plan like Fig. 2 but with certain parts omitted, and certain other parts in positions different from those shown in Fig. 2.

Referring now to Figs. 2 and 3, and remembering that the rocking levers 156L and 156R are fulcrumed on slides 160L and 160R, the mechanism for reciprocating these slides will now be described. The slides are connected by toggles 180L and 180R, composed of adjustable links 182L and 182R and other links 184L and 184R to fixed studs 186L and 186R. The center points of these toggles are connected by adjustable links 188L and 188R to levers 190L and 190R.

Figure 19:
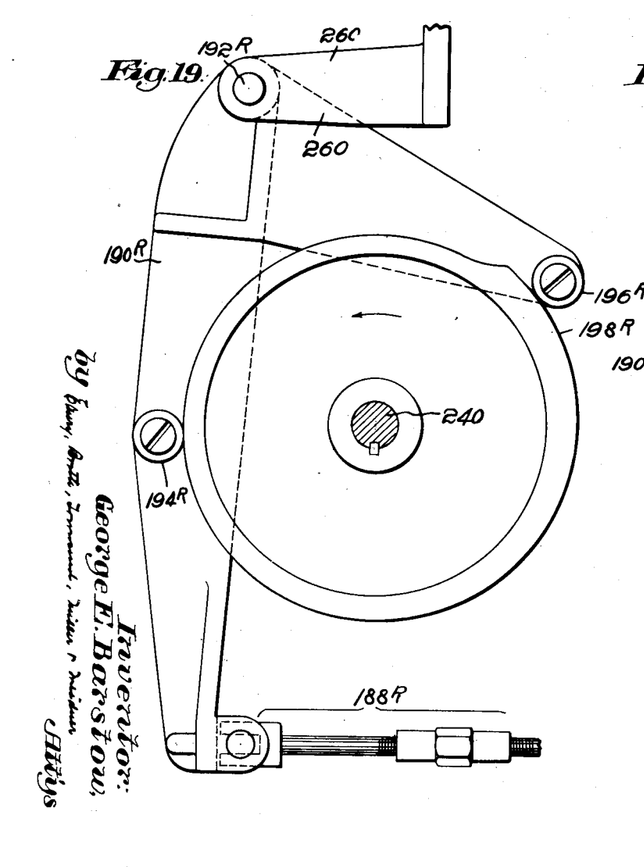
Fig. 19 is a vertical section on an enlarged scale on line 19—19 of Fig. 1.
Figure 20:
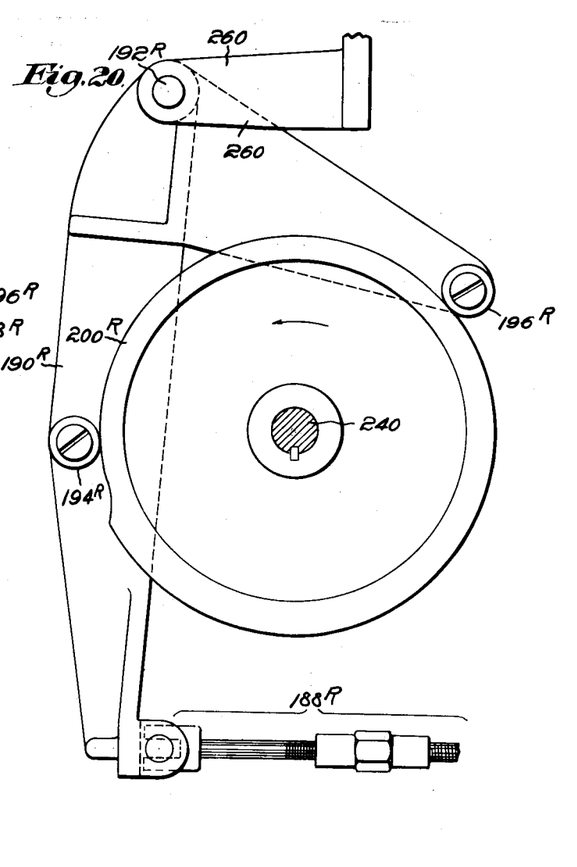
Fig. 20 is a vertical section on an enlarged scale on line 20—20 of Fig. 1.
Figure 21:
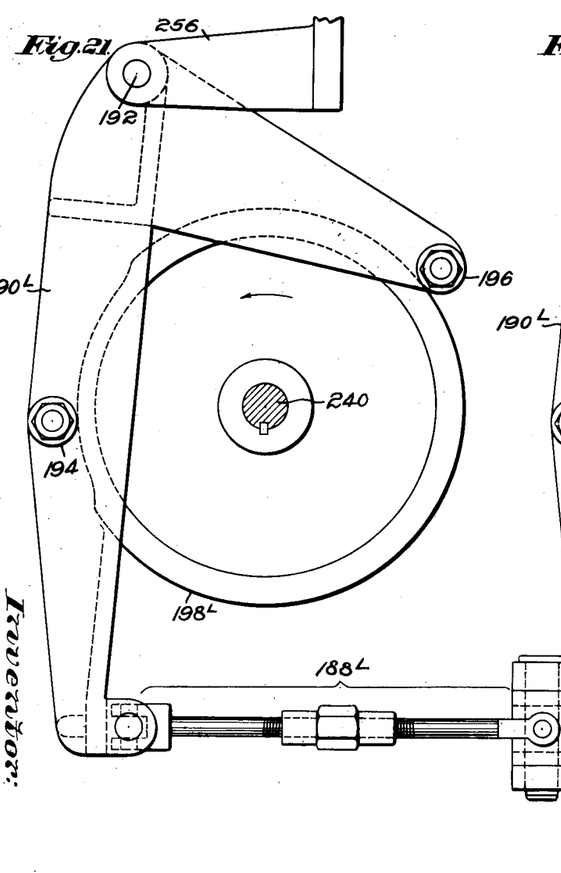
Fig. 21 is a vertical section on an enlarged scale on line 21—21 of Fig. 1.
Figure 22:
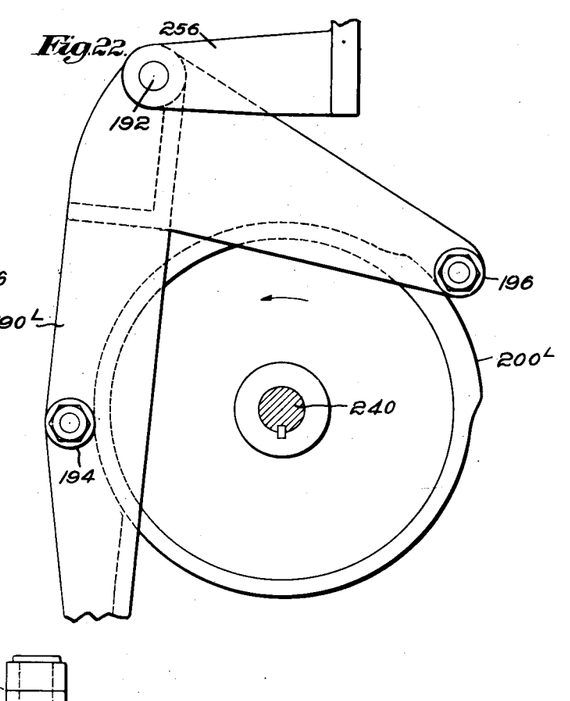
Fig. 22 is a vertical section on an enlarged scale on line 22—22 of Fig. 1.

Referring now to Figs. 21 and 22, the lever 190L is mounted on a fulcrum 192 and carries two cam followers such as rollers 194 and 196 which ride on the perimeters of cams 198 and 200, respectively, though a single roller running in a groove in a single cam might be substituted. Referring now to Figs. 19 and 20, the lever 190R is mounted on a fulcrum 192R and carries two rollers 194R and 196R which ride on the perimeters of cams 198R and 200R, respectively, though a single roller running in a groove in a single cam might be substituted.

The actual timing and coordination of the various cams in their relation to the motions of the several parts which they actuate will be described in connection with the description of the general operation of the machine.

*Mounting of turret*

Because it is desirable to provide for links of different sizes, turrets should be provided with arms differing in number and length. This will naturally call for adjustment of the axis of rotation of the turret toward or from the welding point. Furthermore, this adjustment is desirable in order that the turret may be backed away from the welding point to facilitate application of the chain to the sprocket tooth dies on the arms carried by the turret. It is desirable, not only that the turret arms be replaceable but also that the entire turret be capable of replacement.

To these ends, the turret mounting hereinbefore briefly referred to is not only adjustable toward and from the welding position, but it is also removable from its operating position. This arrangement will now be described, reference being had at first to Fig. 12. In the present example, the turret mounting 60 is in the nature of a swinging arm mounted on a pivot 202 to swing about a vertical axis. Normally, this arm is held against movement about its axis by appropriate means such as a link 204 (see also Figs. 2 and 3) attached at its front end by a pivot 206 to the arm 60 and attached at its rear end by a pivot 208 to a second arm 210 which is pivoted to swing about a vertical axis on a pivot 212.

This second arm 210 is adjustable about its axis but normally is held fixed by appropriate means such as that now to be described, reference being had at first to Fig. 10. In this example, the holding and adjusting means is in the nature of a horizontal rod 214 having at its rear or inner end a screw-thread 216 passed through and threaded into a vertical pivot 218 mounted to turn in upper and lower fixed bearings 220 and 222. The rod passes loosely through a vertical pivot 224 mounted to turn in the arm 210 and the rod is restrained against movement transversely of the axis of the pivot 224 as by being provided at the rear of said pivot with a collar or shoulder 226 and by being provided at the front of the pivot with a collar in the nature of a knob 228 suitably secured as by a pin 230 to the rod.

This arrangement is also well illustrated, though at a smaller scale, in Fig. 2, from an examination of which it is evident that, by turning the knob 228, the arm 210 is swung on its pivot 212 and acts through the link 204 to swing the turret-carrying arm 60 on its pivot 202, thus carrying the entire chain feeding mechanism, including the turret, toward or from the welding position 36.

The arrangement for freeing the turret-carrying arm 60 and allowing it to be swung toward the front of the machine will now be described, reference being had to Figs. 12 and 13, more particularly the latter. It will be remembered that the front end of the link 204 is attached to the turret-carrying arm 60 by a pivot 206. Simple removal of this pivot accomplishes the desired end, and as shown in Fig. 13, the pin is provided with a knurled head 230 which may be grasped to withdraw the pin upwardly thereby freeing the front end of the link 204 from its place in the arm 60, whereupon the right-hand end of the latter may be swung forwardly, carrying the entire chain-feeding mechanism with it.

*Frame and driving shaft*

Figure 1:
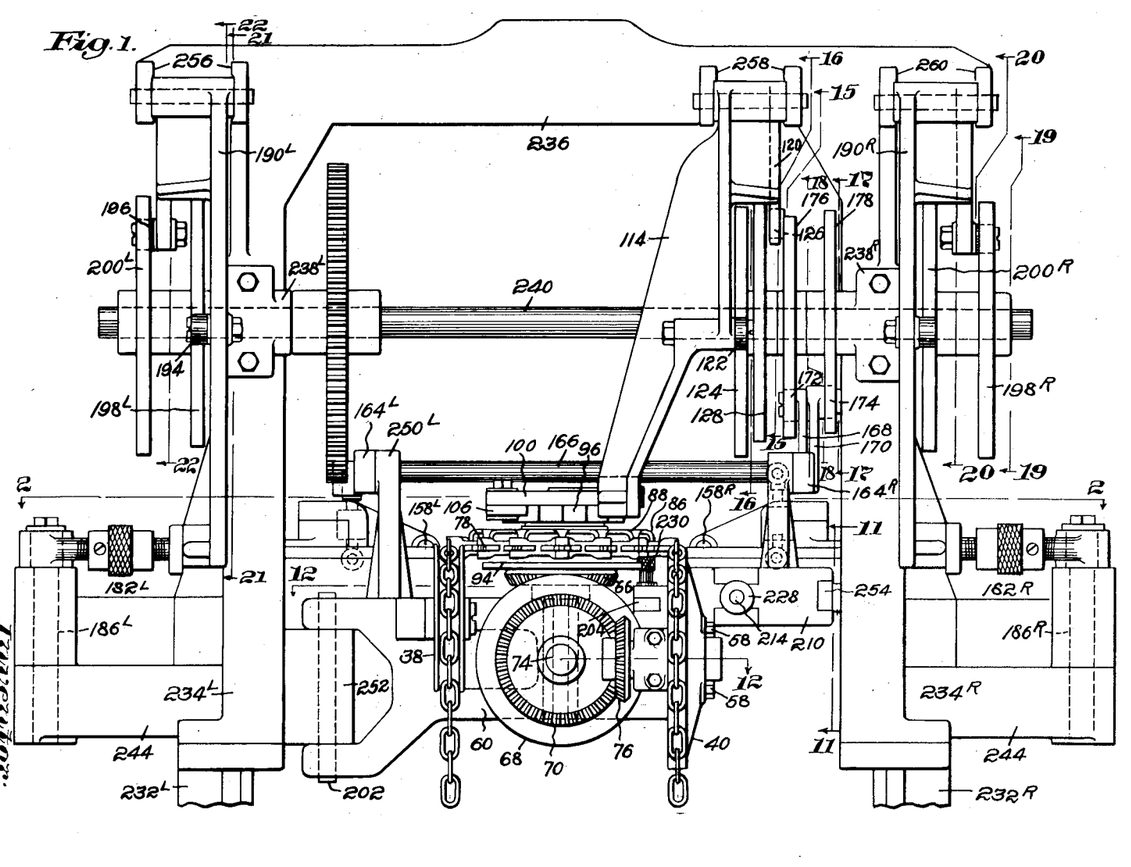
Fig. 1 is a front elevation of that part of a chain welding machine with which the present invention is concerned.
Figure 7:
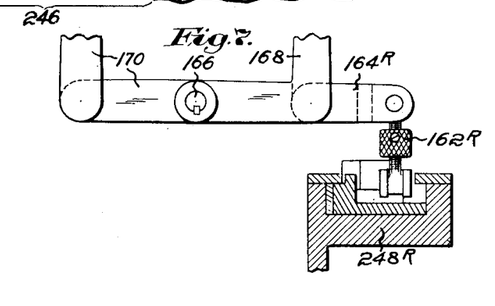
Fig. 7 is a vertical section on line 7—7 of Fig. 4.

The several mechanisms hereinbefore described are supported by an appropriate framework which will now be described, reference being had at first to Fig. 1. The framework includes lower, left and right frame members 232L and 232R which support legs 234L and 234R of an upper frame member 236 which presents left and right bearings 238L and 238R for a cam-shaft 240 on which the several hereinbefore described cams are secured. The upper frame comprises also (see Fig. 4) a horizontal bed 244 presenting a gap 246 which receives the chain-feeding mechanism including the turret. The bed supports the studs 186L and 186R and presents guides 248L and 248R (see Figs. 6 and 7) for the slides 160L and 160R. As shown in Fig. 1, the frame presents bearings 250L and 250R for the rockshaft 166, an ear 252 for the support of the turret-carrying arm 60, an ear 254 for the support of the arm 210, and pairs of ears 256, 258 and 260 for the support of certain of the cam levers.

*General operation*

Figure 23:
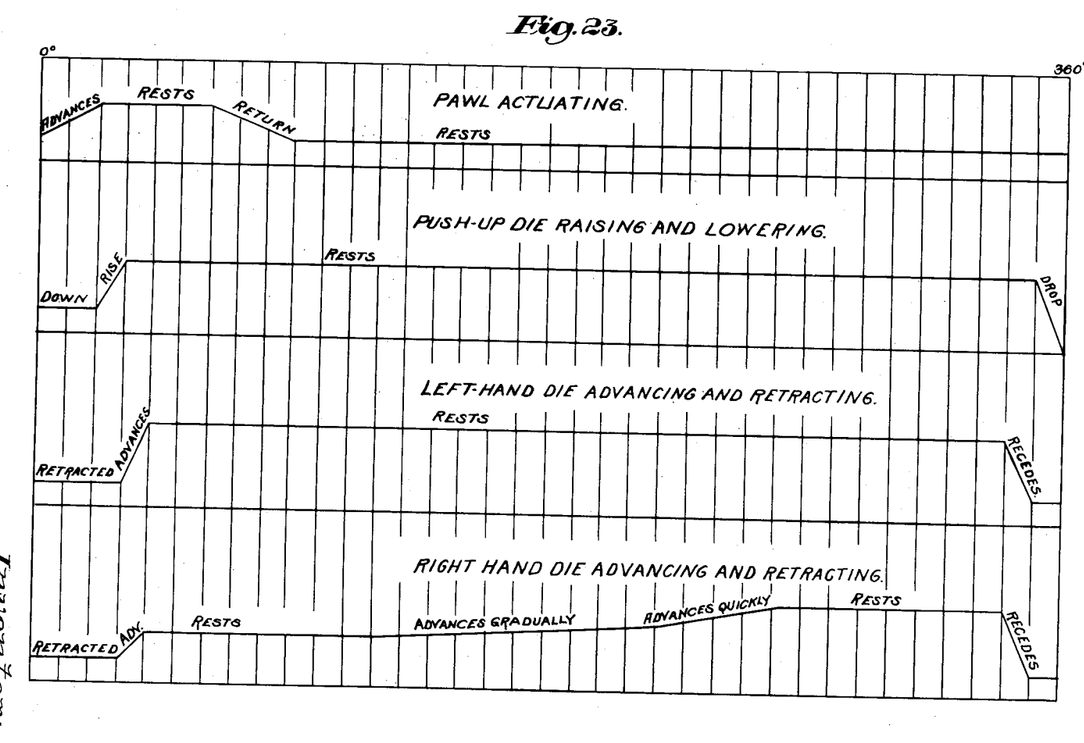
Fig. 23 is a cam time chart illustrating graphically the paths of the various cams and showing the timing and extent of movement of each to the others.

The general operation should be sufficiently clear from the foregoing description but will be reviewed briefly by the aid of Fig. 23 which graphically illustrates the timing of the several cams, remembering that essentially there are but four cams, so far as the motions are concerned. The cam throws are greatly exaggerated for the sake of clarity. The upper curve or graph depicts the path of the cam which produces the motion of the chain feed pawl, the second depicts the path of the cam which produces the up and down movement of the push-up dies, the third depicts the path of the cam which produces the horizontal movement of the left-hand push-up die, and the fourth depicts the path of the cam which produces the horizontal movement of the right-hand push-up die and hence the swinging of the unlocked turret arm die. The horizontal extent of the chart represents one complete rotation of the cam-shaft.

Referring to the first graph, the pawl advances, turns the turret by the space of two alternate links, and then rests. The return may be at any time during the cycle. Referring to the second graph and comparing it with the first, it will be observed that, upon cessation of the pawl advance, the push-up dies, which were lowered, now rise and remain elevated during most of the remainder of the cycle. Referring to the third graph and comparing it with the second, it will be observed that, upon completion of the simultaneous elevation of both push-up dies, the left-hand die advances completely, i. e. to its fullest extent, and remains advanced during most of the remainder of the cycle. Referring to the fourth graph and comparing it with the third, the right-hand push-up die advances part way only, sufficiently to cause the push-up and turret arm dies to close the link joint firmly, and then rests for a period of time sufficient for the advance of the electrodes and the preliminary heating, after which the cam advances the right-hand push-up die at first gradually and then quickly to augment the pressure. There now occurs a rest during which the weld can be swaged. Finally, the push-up dies are retracted quickly, and after their retraction is complete, (now see the second graph) the die raising and lowering cam causes both dies to descend fully. In the meantime, the feed pawl has been returned to its initial position. The cycle is now complete.

Having thus described one embodiment of the invention, what I claim and desire by Letters Patent to secure is:

1. In a machine for manipulating a previously assembled chain, the combination of chain feeding means including dies which engage opposite surfaces of a link, and means to impart a relative movement to said dies, one toward the other, to subject said link to pressure.

2. In a machine for manipulating a previously assembled chain of the interlocked link type, the combination of means for imparting to the chain a step-by-step lengthwise movement by an amount equal to the distance between the centers of alternate links and to bring alternate links, one by one, to a work station, said feeding means including dies which engage opposite portions of a link at the work station, and means to urge at least one of said dies toward the other to subject such link to pressure.

3. In a machine for manipulating a previously assembled chain of the interlocked link type, the combination of means for imparting to the chain a step-by-step lengthwise movement by an amount equal to the distance between the centers of alternate links and to bring alternate links, one by one, to a work station, said feeding means including a die carrier, dies carried by said carrier and arranged to engage opposite portions of a link, mechanism to utilize said carrier to cause said dies to advance said chain intermittently, and means to cause at least one of said dies to move toward the other to subject such link to pressure tending to reduce its perimeter.

4. In a machine for manipulating a previously assembled chain of the interlocked link type, the combination of means for imparting to the chain a step-by-step lengthwise movement by an amount equal to the distance between the centers of alternate links and to bring alternate links, one by one, to a work station, said feeding means including a rotary die carrier, dies carried by said carrier and arranged to feed the chain by engagement with the ends of certain links, mechanism to rotate said die carrier step-by-step to advance said chain intermittently, and means to cause at least one of said dies to move toward the other to subject an interposed link to pressure tending to reduce its perimeter.

5. In a machine for manipulating a previously assembled chain of the interlocked link type, the combination of means for imparting to the chain a step-by-step lengthwise movement by an amount equal to the distance between the centers of alternate links and to bring alternate links, one by one, to a work station, said feeding means including a rotary turret, a set of arms pivoted to said turret to swing about axes parallel with the axis of rotation of said turret, a set of link-engaging dies carried by said arms, respectively, means normally to hold said arms fixed in relation to said turret to enable said dies to feed the chain lengthwise, means to rotate said turret, means to cause the temporary release of said arms in succession, and means to cause each arm, when so released, to swing toward an adjacent arm and to cause the die carried by the released arm to move toward the die on the adjacent arm, thereby to subject an interposed link to pressure tending to reduce its perimeter.

6. In a machine for manipulating a previously assembled chain of the interlocked link type, the combination of means for imparting to the chain a step-by-step lengthwise movement by an amount equal to the distance between the centers of alternate links and to bring alternate links, one by one, to a work station, said feeding means including a rotary turret, a set of arms pivoted to said turret to swing about axes parallel with the axis of rotation of said turret, a set of link-engaging dies carried by said arms, respectively, means normally to hold said arms fixed in relation to said turret to enable said dies to feed the chain lengthwise, means to impart a step-by-step rotation to said turret, means to utilize the rotation of said turret to cause the temporary release of said arms in succession, and means to cause each arm, when so released, to swing in a direction opposite to the direction of rotation of said turret toward an adjacent arm and to cause the die on the released arm to move toward the die on the adjacent arm, thereby to subject an interposed link to pressure tending to reduce its perimeter.

7. In a machine for manipulating a previously assembled chain of the interlocked link type, the combination of means for imparting to the chain a step-by-step lengthwise movement by an amount equal to the distance between the centers of alternate links and to bring alternate links, one by one, to a work station, said feeding means including a rotary turret, a set of arms pivoted to said turret to swing about axes parallel with the axis of rotation of said turret, a set of link-engaging dies carried by said arms, respectively, locking means normally to lock said arms to said turret, means to impart a step-by-step rotation to said turret, a relatively stationary cam to utilize the rotation of said turret to cause the temporary unlocking of said arms in succession, and means to cause each arm, when so unlocked, to swing in a direction opposite to the direction of rotation of said turret toward an adjacent arm and to cause the die on the unlocked arm to move toward the die on the adjacent arm, thereby to subject an interposed link to pressure tending to reduce its perimeter.

8. In a machine for manipulating a previously assembled chain of the interlocked link type, the combination of means for imparting to the chain a step-by-step lengthwise movement by an amount equal to the distance between the centers of alternate links and to bring alternate links, one by one, to a work station, said feeding means including a rotary turret, a set of arms pivoted to said turret to swing about axes parallel with the axis of rotation of said turret, a set of link-engaging dies carried by said arms, respectively, locking means including a set of latches interlocking with a set of locking pins, respectively, means to impart a step-by-step rotation to said turret, a relatively stationary cam to utilize rotation of said turret to cause the temporary unlocking of said arms in succession by engaging said latches successively and moving them, one at a time, out of interlocking engagement with said pins, and means to cause each arm, when thus unlocked, to swing in a direction opposite to the direction of rotation of said turret toward an adjacent arm and to cause the die on the unlocked arm to move toward the die on the adjacent arm, thereby to subject an interposed link to pressure tending to reduce its perimeter.

9. In a chain making machine, the combination of a chain feed wheel carrying means to feed the chain in a horizontal plane past a work station, a chain take-up wheel which receives the chain from said feed wheel, mechanism connecting said wheels to cause them to rotate in synchronism, and means providing for rotative adjustment of said take-up wheel relative to said feed wheel.

10. In a chain making machine, the combination of a chain feed wheel carrying means to feed the chain in a horizontal plane past a work station, a chain take-up wheel which receives the chain from said feed wheel, mechanism connecting said wheels to cause them to rotate in synchronism, and means providing for rotative adjustment of said take-up wheel relative to said feed wheel, said means including a frictional clamp having relatively rotative parts which may be turned, one with relation to the other, and clamped to each other.

11. In a chain making machine, the combination of a chain-guiding wheel rotating about a horizontal axis, a chain-feeding wheel rotating about a vertical axis and receiving the chain from said chain-guiding wheel, a chain take-up wheel rotating about a horizontal axis and receiving the chain from said chain-feeding wheel, and mechanism connecting said chain-feeding wheel and said chain take-up wheel to cause them to rotate in synchronism.

12. In a chain making machine, the combination of two push-up dies, means to cause said dies to approach each other to apply pressure to a link and to recede one from the other, and means to cause said movement of said dies toward and from the plane of the link.

13. In a chain making machine, the combination of means to move the chain through an arc to a point where a link is to be operated upon, two dies, means to move said dies toward and from each other along a path tangent to said arc, and means to move said dies in a direction transverse to said path.

14. In a chain making machine, the combination of a sprocket wheel to feed the chain and to bring a link to a point to be operated upon by dies, and means to cause said dies to approach each other and to squeeze the link, then to recede from each other, and finally to move in a direction lengthwise of the axis of said sprocket to clear the latter and the chain.

15. In a chain making machine, the combination of a sprocket wheel, means to rotate said sprocket wheel intermittently to cause the chain to be fed step-by-step to bring successive links to a point to be operated upon by dies, and mechanism to cause said dies to approach each other along a path tangent to said wheel, then to recede from each other along said path, and finally to move in another direction out of said path.

16. In a chain making machine, the combination of a rotatable turret, a set of arms pivoted on said turret to swing about axes parallel with the axis of rotation of said turret, a set of dies carried by said arms, respectively, and arranged to engage two alternate links, means normally to lock said arms to said turret, means to impart a step-by-step rotative movement to said turret and to utilize engagement of said dies with said links to advance the chain step-by-step, means to cause said arms to be unlocked from said turret in succession, two push-up dies, means to cause said push-up dies to approach each other, then to recede from each other, and finally to move in another direction out of the path of the chain, and means to cause each arm when unlocked from said turret to swing toward an adjacent arm and to cause the die carried by the unlocked arm to move toward the die on the adjacent arm.

17. In a machine for manipulating a previously assembled chain of the interlocked link type, the combination of a rotatable turret, a series of arms pivoted on said turret to swing about axes parallel with the axis of rotation of said turret, a series of dies carried by said arms, respectively, each die being formed to enter one link and to engage the perimeters of two adjacent links, means normally to lock said arms to said turret, means to rotate said turret step-by-step and to utilize said dies as teeth to advance the chain step-by-step by an amount substantially equal to the distance between the centers of alternate links and to bring the alternate links, one by one, to a work-station, means to cause said arms to be unlocked from said turret, one by one, after passing said work-station, two push-up dies formed to engage opposite ends, respectively, of a link at said work-station, means to bring one push-up die into engagement with one end of such link, means to bring the second push-up die into engagement with and to press against the second end of such link, means to couple the second push-up die to successive arms as they pass said work-station, and to utilize that coupling to swing an arm and to cause the die carried by that arm to press against said second end of such link, and means to cause said push-up dies to recede from such link lengthwise of the axis of said turret.

18. In a chain making machine, the combination of a sprocket wheel to feed the chain, push-up dies to operate on the chain, and a sprocket wheel support mounted to move toward and from said dies.

19. In a chain making machine, the combination of a rotatable turret, a set of dies carried by said turret and constituting sprocket teeth to feed the chain, a pair of push-up dies, means to cause step-by-step rotation of said turret to bring successive links to a work station, means to cause cooperation of said push-up dies with certain of said dies carried by said turret to compress a link at the work station, a turret support mounted to move toward and from said push-up dies, and means normally to retain said support against movement from said push-up dies.

20. In a chain making machine, the combination of a rotatable turret, a set of dies carried by said turret and constituting sprocket teeth to feed the chain, a pair of push-up dies, means to cause step-by-step rotation of said turret to bring successive links to a work station, means to cause cooperation of said push-up dies with certain of said dies carried by said turret to compress a link at the work station, a turret support mounted to move toward and from said push-up dies, and means for adjusting said support toward and from said push-up dies.

GEORGE E. BARSTOW.